US012802034B2

(12) United States Patent
Kemp

(10) Patent No.: US 12,802,034 B2
(45) Date of Patent: Nov. 17, 2026

(54) INVENTORY MANAGEMENT SYSTEM

(71) Applicant: LC Investment Holdings, LLC, Hartland, WI (US)

(72) Inventor: Elizabeth Kemp, Oconomowoc, WI (US)

(73) Assignee: LC INVESTMENT HOLDINGS, LLC, Hartland, WI (US)

( * ) Notice: Subject to any disclaimer, the term of this patent is extended or adjusted under 35 U.S.C. 154(b) by 0 days.

(21) Appl. No.: 19/290,832

(22) Filed: Aug. 5, 2025

(65) Prior Publication Data

US 2026/0099809 A1 Apr. 9, 2026

Related U.S. Application Data

(60) Continuation-in-part of application No. 19/256,689, filed on Jul. 1, 2025, and a division of application No. 18/084,357, filed on Dec. 19, 2022, now Pat. No. 12,373,778.

(51) Int. Cl.

| | |
|---|---|
| ***G06Q 10/087*** | (2023.01) |
| ***B65D 88/12*** | (2006.01) |
| ***B65D 90/00*** | (2006.01) |
| ***B65D 90/48*** | (2006.01) |

(52) U.S. Cl.
CPC ......... *G06Q 10/087* (2013.01); *B65D 88/121* (2013.01); *B65D 90/008* (2013.01); *B65D 90/48* (2013.01); *B65D 2590/0083* (2013.01)

(58) Field of Classification Search
CPC .. G06Q 10/087; B65D 88/121; B65D 90/008; B65D 90/48; B65D 2590/0083
USPC ........................................................ 705/28
See application file for complete search history.

(56) References Cited

U.S. PATENT DOCUMENTS

| | | | | |
|---|---|---|---|---|
| 7,038,585 | B2 | 5/2006 | Hall et al. | |
| 9,704,000 | B2 | 7/2017 | Pleshek et al. | |
| 10,592,861 | B2 | 3/2020 | Kemp | |
| 2009/0146832 | A1* | 6/2009 | Ebert | H04L 67/12 340/8.1 |
| 2018/0225625 | A1* | 8/2018 | DiFatta | G06Q 10/087 |
| 2023/0209022 | A1* | 6/2023 | Bashkin | G07C 9/00896 705/28 |
| 2023/0377083 | A1* | 11/2023 | Lowry | G06Q 20/14 |

* cited by examiner

*Primary Examiner* — Garcia Ade
(74) *Attorney, Agent, or Firm* — Donald J. Ersler

(57) ABSTRACT

An inventory monitoring system preferably includes a computer monitoring device and a plurality of containers. The computer monitoring device includes a computer, an artificial intelligence module, a software a transceiver and a display device. The software program preferably includes compliance tracking, event reporting replacement alerts, video training, log generation, remote inventory checking of each storage container, a list of items to be ordered for the next year and supplying regulator alerts. Each container preferably includes a storage container, a container transceiver, a microcontroller, a battery, a location sensor, an opening and closing sensor, an item tracking sensor, at least one identity monitoring device, a temperature sensor, a humidity sensor and a low battery indicator. A plurality of items are stored in the plurality of containers. The storage container preferably includes a locking cover. The microcontroller will also periodically test all sensors connected thereto.

20 Claims, 3 Drawing Sheets

INVENTORY MANAGEMENT SYSTEM

1. CROSS REFERENCE TO RELATED APPLICATIONS

This is a continuation-in-part patent application which takes priority from divisional patent Ser. No. 19/256,689, filed on Jul. 1, 2025, which takes priority from patent application Ser. No. 18/084,357, filed on Dec. 19, 2022, now U.S. Pat. No. 12,373,778, issued on Jul. 29, 2025, which are thereby incorporated by reference in their entirety.

BACKGROUND OF THE INVENTION

2. Field of the Invention

The present invention relates generally to management of items, and more specifically to an inventory management system, which tracks items removed or added to a plurality of containers.

3. Discussion of the Prior Art

Critical items frequently have the necessity of being stored in a secure container. It would be useful to track when the critical items are removed or added to the secure container. U.S. Pat. No. 7,038,585 to Hall et al. discloses a cargo lock and monitoring apparatus and process. U.S. Pat. No. 9,704,000 to Pleshek et al. discloses a mobile RFID container and distribution method. U.S. Pat. No. 10,592,861 to Kemp discloses an active shooter response system for initiating silent alert and deploying tactical tools.

Accordingly, there is a clearly felt need in the art for an inventory management system, which tracks items removed or added to a plurality of containers and limits access to a list of individuals with the aid of artificial intelligence.

SUMMARY OF THE INVENTION

The present invention provides an inventory management system, which tracks items removed or added to a plurality of containers. The inventory management system preferably includes a computer monitoring device and a plurality of containers. The computer monitoring device includes a suitable computer, an artificial intelligence module and a monitoring software program (software program), a transceiver and a display device. The software program preferably includes compliance tracking, event reporting replacement alerts, video training, various software applications, reporting, log generation, remote inventory checking of each storage container, camera alerts to exterior services, including management security, a list of items to be ordered for the next year and supplying regulator alerts. It is preferable that the software program be capable of wireless updates. Event reporting occurs when the storage container is opened; the storage container is closed; items are removed from the storage container; items are inserted into to the storage container; the storage container is moved; or any event related to the storage container. After the storage container is closed, a microcontroller will inventory all the tagged items in the storage container and send an inventory list to the software program. The inventory list could be sent to a responsible individual to place an order for missing items, or items that are near their expiration date. The software program provides links to training videos for how to use each item in the storage container, safety and also reality training for how to react to a particular scenario. For example, how to apply a tourniquet or remove an item. The logs are generated when the storage container is opened; the storage container is closed; the storage container is moved; items are removed from the storage container; items are inserted into the storage container; and information about the items. The logs also supply the items contained in each storage container. All information in the computer is accessible through the display device, or a portable wireless device application.

The regulatory alerts are monitored by the software program to ensure compliance with regulations or regulatory compliance. The software program is capable of sending a maintenance notice concerning a storage container for some maintenance issue to be implemented. The computer could be made portable, such as locating thereof in a vehicle. The software monitoring program is installed on the computer, a cell phone, or electronic wireless device. The transceiver is connected to the input and output ports of the computer or hard wired.

Each container preferably includes a storage container, a container transceiver, a microcontroller, a battery, a location sensor, a lock sensor, a movement sensor, a thermal printer, retinal scanner, an opening and closing sensor, an item tracking sensor, a plurality of tagged items; at least one identity monitoring device, a temperature sensor, a humidity sensor, a cellular sensor and a low battery indicator. The location sensor is preferably tracked through GPS, cellular or satellite. The storage container could be a cabinet, a case or any other suitable storage enclosure. A magnet sensor may used for the opening and closing sensor. Wireless communication between the transceiver and the container transceiver is implemented with WIFI, power over Ethernet (POE), satellite, or cellular communication between the transceiver and cloud-API. It is preferable that an antenna of the transceiver be located inside or an outside of the storage container. A second antenna may be necessary if the tagged items in the storage container are located to close to each other. A repeater antenna could also be included with the storage container. The storage container preferably includes a locking cover. However, the storage container could be integrated into a secondary container, such as a cargo container. The cover may be locked with a key lock, a combination lock, a microcontroller-controlled combination lock, an eye scan, finger print reader, slide card, or any other suitable lock. The microcontroller is retained in the storage container. The container transceiver is located in the storage container and connected to the microcontroller. The microcontroller or container transceiver should be able to store data on an SD card when a connection is lost. The data on the SD card should be able to be deleted remotely.

The location sensor is connected to the microcontroller to periodically transmit a location of the storage container. The opening and closing sensor is also connected to the microcontroller. The opening and closing sensor sends a signal to the computer, when the cover is opened or closed. However, a transmitter could be used instead of the container transceiver, if receiving data is not necessary. The microcontroller will also periodically test all sensors connected thereto. A report will be sent to the software program of the status of the sensors and events.

An expiration date and unique item identifier (UDI) of items (if needed by an item) in each container is tracked by the software monitoring program. A tracking device is attached to each item that may have an expiration date. For example, pills may be placed in a sleeve and the sleeve tagged. The tracking device could be a lower power RFID tag. However, it is preferable that tracking device be Bluetooth low energy (BLE) or ultra-wide ban (UWB). The item tracking sensor is connected to the microcontroller and will sense when one of the items is removed from the storage container and transmit a message to the computer through the transceiver. However, the storage container could be hard wired to the microcontroller. A battery monitoring system may be used to monitor the charge of the battery. The low charge condition of the battery would be transmitted to the computer. It is preferable that the battery be rechargeable and replaceable. The at least one identity monitoring device includes a camera, a facial recognition device, a fingerprint reading device and a special log in by a card reader. It is preferable that the electronic components in the storage container operate on a low power mode when the cover is closed and are supplied with full power when the cover is opened. The camera may be mounted inside or outside the storage container.

The artificial intelligence module learns when items in the storage containers are depleted, before they actually are depleted; provides a test for training videos and evaluates answers to the test questions; notifies a user that a storage container is in an incorrect location; tests an electrical resistance values of sensors to predict premature failure; tests voltage values of batteries to predict premature failure; sending queries for following up on regulatory compliance; sending queries for following up on maintenance compliance; predicting when reordering of items in the plurality of storage containers should be made; and recording the number of times and time intervals that a container is accessed to predict an unauthorized access or movement to a different location.

Accordingly, it is an object of the present invention to provide an inventory management system, which tracks items removed or added to a plurality of containers with the aid of artificial intelligence.

These and additional objects, advantages, features and benefits of the present invention will become apparent from the following specification.

DETAILED DESCRIPTION OF THE PREFERRED EMBODIMENTS

Figure 1:
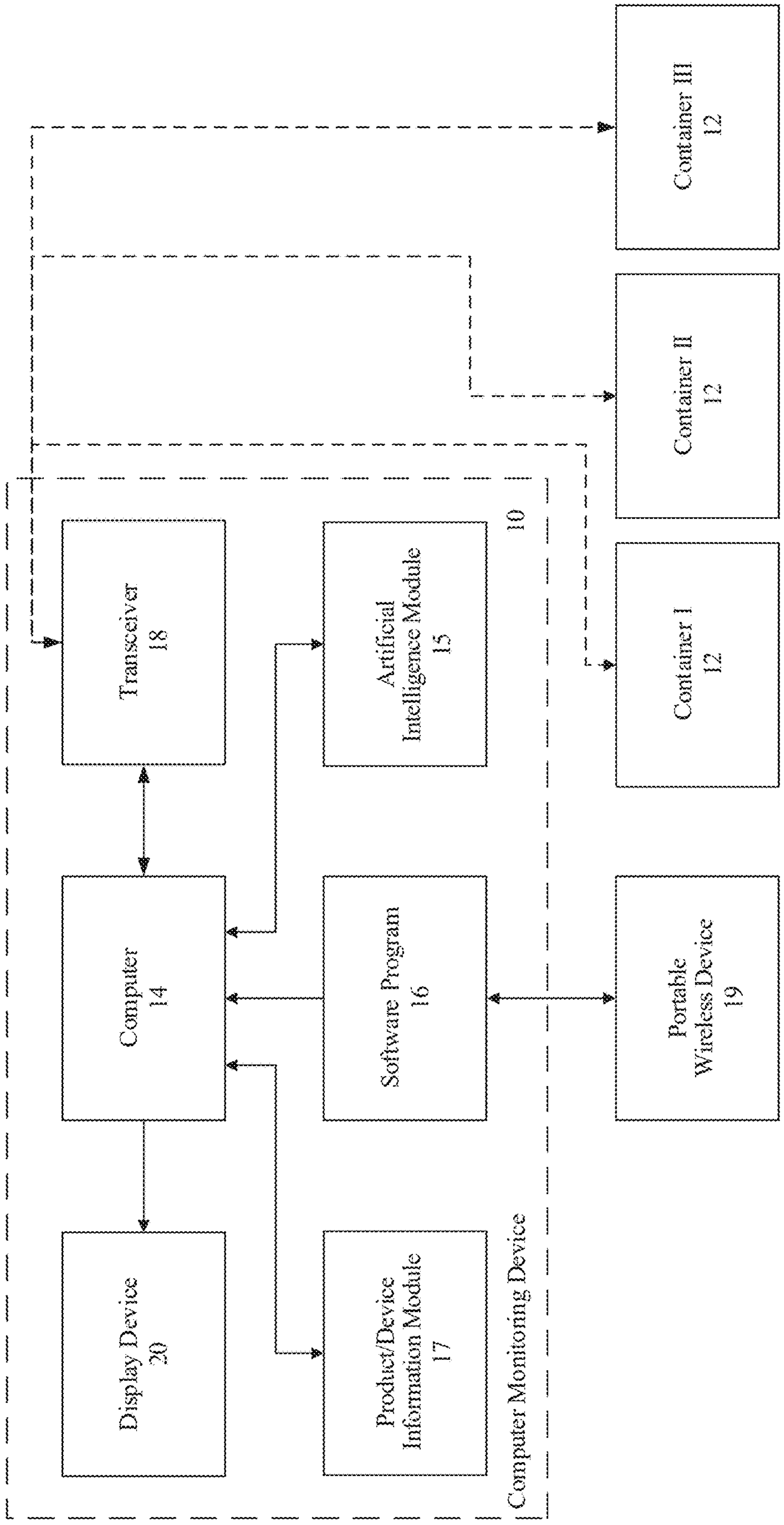
FIG. 1 is a schematic diagram of an inventory monitoring system in accordance with the present invention.
Figure 2:
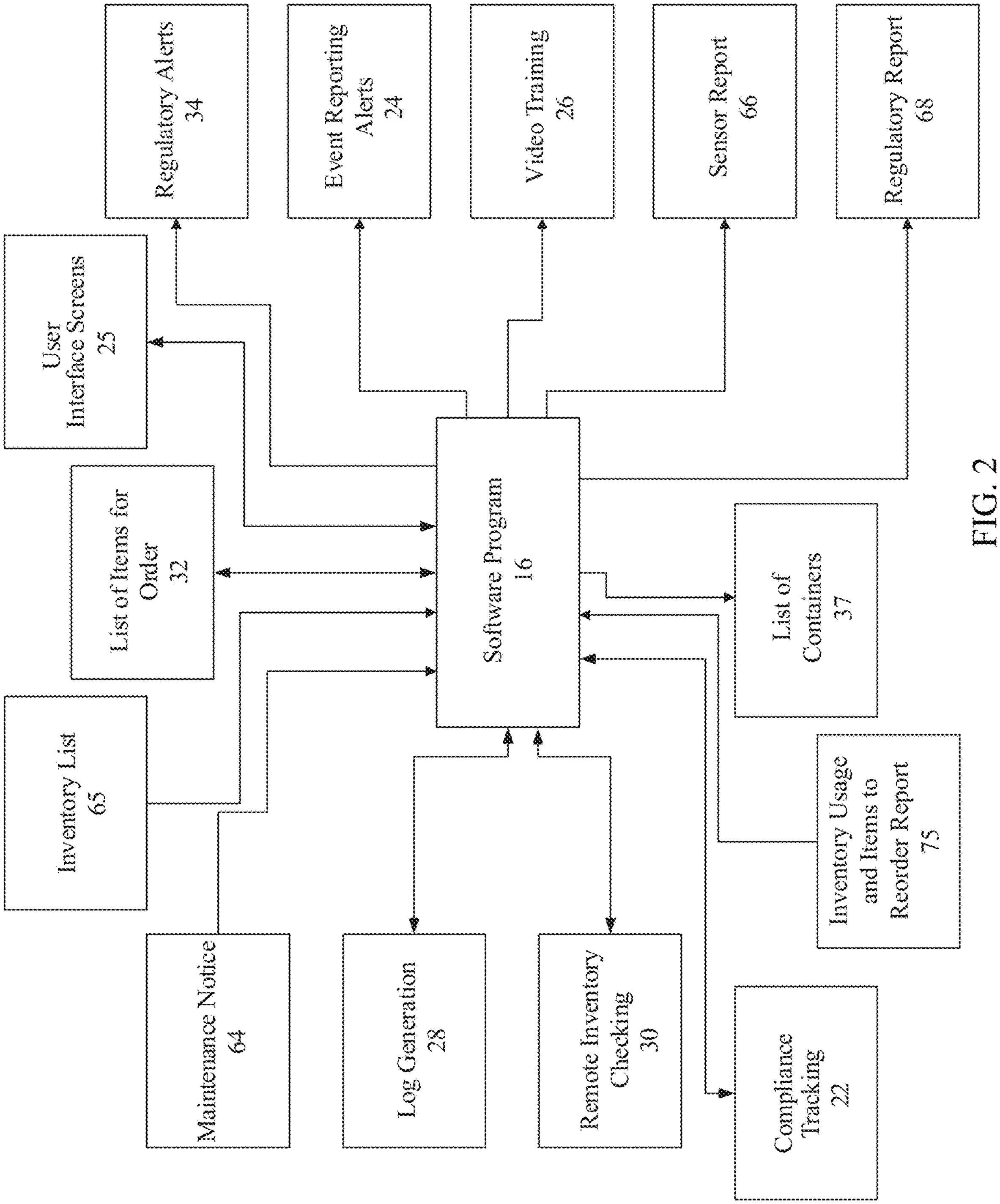
FIG. 2 is a schematic diagram of a software program of an inventory monitoring system in accordance with the present invention.

With reference now to the drawings, and particularly to FIG. 1, there is shown an inventory monitoring system 1. The inventory monitoring system 1 preferably includes a computer monitoring device 10 and a plurality of containers 12. The computer monitoring device 10 preferably includes a suitable computer 14, an artificial intelligence module 15 and a monitoring software program (software program) 16, a product/device information module 17, a transceiver 18 and a display device 20. With reference to FIG. 2, the software program 16 preferably includes compliance tracking 22, event reporting replacement alerts 24, video training 26, log generation 28, remote inventory checking of each storage container 30, a list of items to be ordered for the next year 32, supplying regulator alerts 34, recent event history 35 and a list of the plurality of containers (list of containers) 37. It is preferable that the software program 16 be capable of wireless updates. The computer 14 could be made portable, such as locating thereof in a vehicle, or at an offsite location. The software program 16 is installed on the computer 14 or a portable wireless device 19. The product/device information module 17 contains information about all the items stored in the plurality of containers 12, such as expiration dates, bar codes, usage manuals, content, training information and unique device identifiers. The transceiver 18 is connected to the input and output ports of the computer 14. However, the connection between some or all of the plurality of containers 12 and computer monitoring device 10 may be hard wired. When goods are transferred from one container 12 to a different container 12, the product device information module 17 is updated to reflect that the goods have transferred to the different container 12 by the monitoring software program 16.

All information in the computer 14 is accessible through the display device 20 or a portable wireless device application on the portable wireless device 19. The software program 16 includes a user interactive screen 25, which provides links for displaying the compliance tracking 22, the event reporting replacement alerts 24, the video training 26, the log generation 28, the remote inventory checking of each storage container 30, the list of items to be ordered for the next year 32, supplying regulator alerts 34, the recent event history 35 and the list of containers 37 on the display device 20. The video training 26 may utilize the artificial intelligence module 15 by providing a test to ensure that the participant fully understood the video. The participant would answer questions in a test. The answers would be compared by the artificial intelligence module 15 to the correct answers and the participant provided with a test score.

Figure 3:
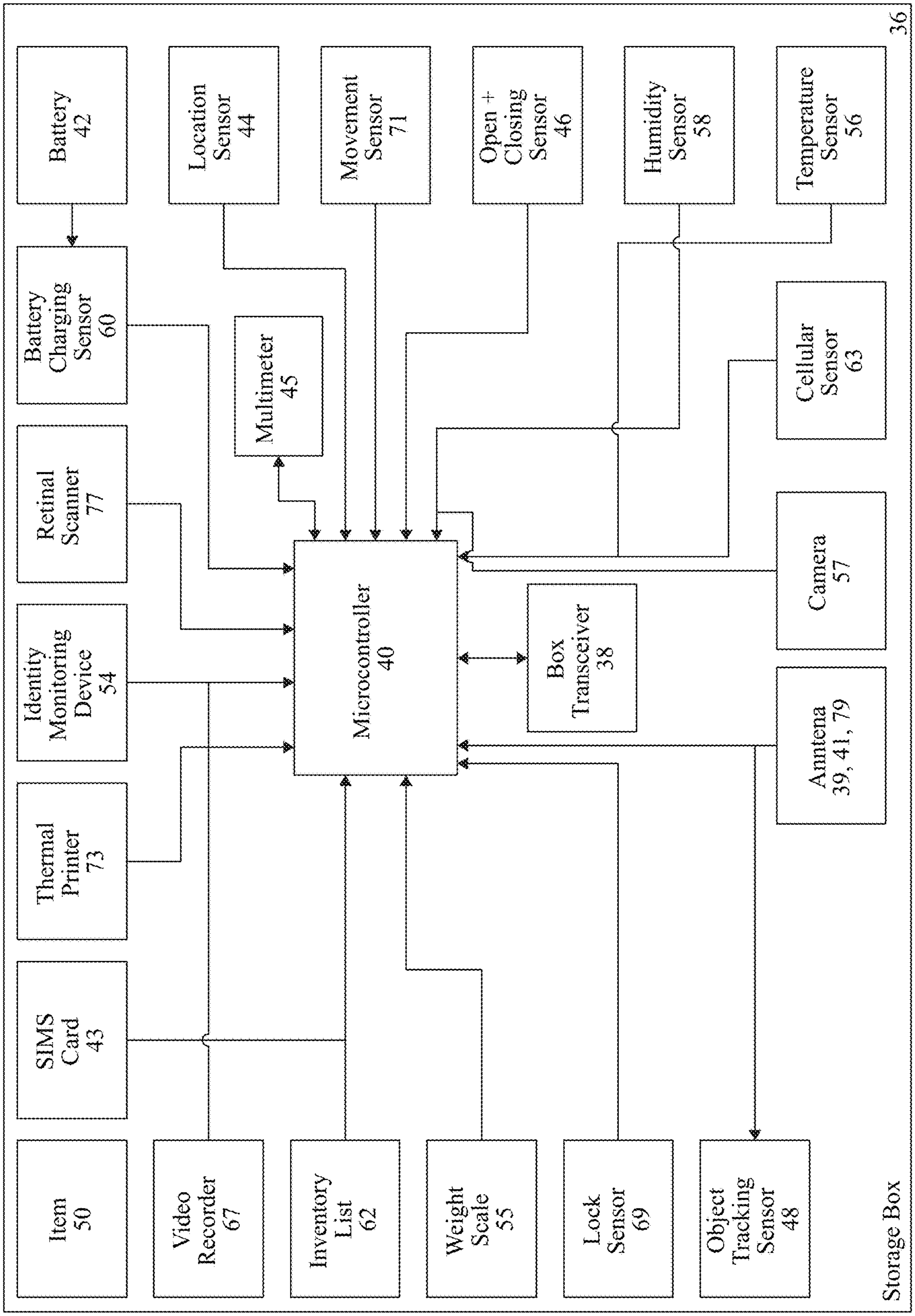
FIG. 3 is a schematic diagram of a container of an inventory monitoring system in accordance with the present invention.

With reference to FIG. 3, each container preferably includes a storage container 36, a container transceiver 38, a microcontroller 40, a battery 42, a location sensor 44, an opening and closing sensor 46, an item tracking sensor 48, at least one identity monitoring device 54, a weight scale 55, a temperature sensor 56, a humidity sensor 58, a battery charge sensor 60, a cellular sensor 63, a lock sensor 69, a movement sensor 71, a thermal printer 73 and a retinal scanner 77. The computer 14 is used in conjunction with the location sensor 44 and the artificial intelligence module 15 to send a message that a particular container 12 is in the wrong location. The computer 14 is used in conjunction with a multimeter 45 to measure electrical resistance and the artificial intelligence module 15 to measure and record electrical resistance values of the opening and closing sensors 46, the item tracking sensors 48, the temperature sensors 56, the humidity sensors 58, the battery charge sensors 60 and the cellular sensors 63 to determine their resistance values.

The resistance values of the sensors provide a record of the sensor resistance values of the sensors just before they fail. Thus, a critical resistance value could be used to predict when a sensor should be replaced. The computer 14 is also used in conjunction with a multimeter 45 and the artificial intelligence module 15 to measure and record voltage of batteries 42. The voltage values of the batteries provide a record of the voltage values of the batteries 42 just before they fail. Thus, a critical voltage value could be used to predict when a battery 42 should be replaced.

The lock sensor 69 sends a signal to the computer 14 concerning whether a particular container is locked. The movement sensor 71 sends a signal to the computer 14 as to whether a particular container 12 has been moved from a previous location to a new location. The thermal printer 73 may be used to print receipts, labels, barcodes, shipping labels and the like for items stored in the container 12. The retinal scanner 77 is used as a security device to allow an individual to open a particular container 12 by scanning their retinas.

A plurality of items 50 are retained in the storage container 36. Event reporting alerts 24 occur when the storage container 36 is opened; the storage container 36 is closed; items are removed from the storage container 36; items are added to the storage container 36; the storage container is moved 36; or any event related to the storage container 36. The reporting alerts 24 preferably include a time stamp, length of time opened and closed and production or device information. After the storage container 36 is closed, the microcontroller 40 will inventory all tagged items 50, 52 in the storage container 36 and will generate an inventory list 62, which is sent to the software program 16. Alternatively, the software program 16 will keep track of all the items 50, 52 added and removed from the storage container 36 and generate an inventor list 65. The inventory list 62, 65 could be emailed to a responsible individual to place an order for missing items; items that are near their expiration date; a security department; or an outside agency. An order to replenish items is preferably linked to each particular container and upon receipt of the ordered items. A video recorder 67 is preferably connected to the microcontroller 40.

The software program 16 provides links to the training videos 26 for how to use items 50, 52 in the storage container 36; reality training for how to react to a particular scenario; or utilization of item hazard handing instructions. For example, how to apply Cobra Cuffs for restraining an individual. It is preferable to track logged-in users who access each video. The logs 28 are generated when the storage container 36 is opened; the storage container 36 is closed; the storage container 36 is moved; items 50, 52 are removed from the storage container 36; and items are inserted into the storage container 36. The logs 28 also supply the items contained in each storage container. The regulatory alerts 34 are monitored by the software program 16 to ensure compliance with government regulations and regulatory compliance. The artificial intelligence module 15 may be used to query an individual responsible for regulator compliance to verify whether regulatory compliance has been implemented and what was done to implement the regulatory compliance. The regulatory compliance response may be compared to a list of suggested answers by the artificial intelligence module 15.

The software program 16 is capable of sending a maintenance notice 64 concerning a storage container 36 for some maintenance issue to be implemented. The maintenance notice 64 is used in conjunction with the artificial intelligence module 15 to record the frequency of maintenance notices, which can be used to calculate and check the average time intervals between maintenance notices to alert an individual to make a manual check to make sure ever maintenance notice has been received by the inventory monitoring system 1. The artificial intelligence module 15 may also be used to query an individual responsible for maintenance compliance to verify that a maintenance issue has been checked and how the maintenance issue was checked. The maintenance response may be compared to a list of suggested answers by the artificial intelligence module 15.

The list of containers 37 provides each container of the plurality of containers 12. Each listed container includes a link, which may be clicked on to provide current contents; the UDI; type; organization, department or assignment; physical location; at least one photograph thereof and status of that particular container. Each item in the current contents may be clicked on to display lot numbers; expiration dates; or unique device identifiers (UDI). Event history for each container may also be obtained by clicking on a link.

The storage container 12 could be a cabinet, a case, a box or any other suitable storage enclosure. A magnet type sensor or similar device may be used for the opening and closing sensor 46. Wireless communication between the transceiver 18 and the container transceivers 12 are implemented with WIFI, power over Ethernet (POE) or cellular communication between the transceiver and cloud-API. It is preferable that an antenna 39 of the container transceiver 38 be located inside or outside of the storage container 36. A second antenna 41 may be necessary if the tagged items 50, 52 in the storage container 36 are located to close to each other. A repeater antenna could also be included with the storage container 79 to improve signal reception. The storage container 36 preferably includes a locking cover or a locking cover door. However, the storage container 36 could be integrated into a secondary container, such as a cargo container. The cover may be locked with a locking device, such as a key lock, a combination lock, a microcontroller-controlled combination lock, an eye scan, finger print reader, slide card, or any other suitable lock. The microcontroller is retained in the storage container 36. The container transceiver 38 is located in the storage container 36 and connected to the microcontroller 38. The microcontroller 40 or container transceiver 38 should be able to store data on an SD card when a connection is lost. The data on the SD card should be able to be deleted remotely by the software program 16. A sims card 43 is connected to microcontroller 40 to provide real time updates to the microcontroller 40.

The location sensor 44 is connected to the microcontroller 40 to periodically transmit a location of the container 12. The opening and closing sensor 46 is also connected to the microcontroller 40. The opening and closing sensor 46 sends a signal to the computer 14, when the cover is opened or closed. However, a transmitter could be used instead of the container transceiver 38, if receiving data is not necessary. The container transceiver 38 and the transmitter are wireless communication devices. The microcontroller 40 will also periodically test all sensors connected thereto for functionality. A sensor report 66 will be sent to the software program 16 concerning the status of the sensors. It is preferable to have regulatory report 68. The regulatory report 68 preferably includes a complete FDA log for each container; a usage report including financial impact; expiring items report for future planning and budgeting; missing items and an order history report. A report for inventory usage and items to be reorder 75 is automatically created by the software program 16. Thus, the items in the plurality of containers are automatically reordered based on the frequency of the items removed from the container. For example, if an item, such as a stop bleeding kit is removed from the container 12 on average every ten days, the software program 16 of the computer monitoring device 10 will send out an order for more, before the last one of the stop the bleeding kits is removed from the container 12, or forward notices. An artificial intelligence routine in the software program 16 predicts when the stop the bleeding kits will be emptied or any other item in the container 12, and orders the items before they run out, or alert a responsible agency or individual.

An expiration date of the items 50 (if needed by an item) in each container 12 is tracked by the software program 16. It is preferable that each item 50 include a tracking device, such as a unique device identifier (UDI) for each item. For example, pills may be placed in a sleeve and the sleeve tagged. The tracking device could be a lower power RFID tag. However, it is preferable that tracking device be Bluetooth low energy (BLE) or ultra-wide ban (UWB). The item tracking sensor 48 is connected to the microcontroller 40 and will sense when one of the items 50 is removed from the storage container and transmit a message to the computer 14 through the container transceiver 38. The battery charge sensor 60 may be used to monitor the charge of the battery 42. A low charge condition of the battery 42 would be transmitted to the computer 16. It is preferable that the battery 42 be rechargeable and replaceable. The identity monitoring device 54 preferably includes a camera 57, a facial recognition device, a fingerprint reading device and a special log in by a card reader. The camera 57 may also include an integral video recording device. The weight scale 55 is connected to the microcontroller 40. The weight scale 55 allows items 50 to be weighed and the weight transmitted to the computer 14 for relative measurements and event recording. It is preferable that the electronic components in the storage container 36 operate on a low power mode when the cover is closed and are supplied with full power when the cover is opened. The camera 57 may be mounted inside or outside the storage container 36.

The identity monitoring device 54 is used in conjunction with the artificial intelligence module to record the number of times the container 12 is accessed; the time intervals between each access and the frequency of the accesses by particular individuals. The information is used to predict when the next access will occur and by the particular individual to determine if the particular individual is accessing the container 12 outside the normal interval of accesses. Further, the artificial intelligence module 15 may be used to identify and report an employee who opens a container 12, but does not close the container 12 or does not have proper access to the container 12.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed:

1. An inventory monitoring system, comprising:

a plurality of containers, each one of said plurality of containers including a wireless communication device and an opening and closing sensor;

a computer capable of wirelessly communicating with said plurality of containers through a software program, said opening and closing sensor sends data to said computer concerning the opening and closing of said plurality of containers; and a monitoring device for identifying a plurality of users accessing said plurality of containers, said software program recording a frequency of accesses and a time interval of the accesses by each one of said plurality of users, calculating an average time interval for the plurality of accesses for each user, monitoring said plurality of containers to determine if a particular accesses is not within the average time interval for a user making the access, sending an alert to said computer concerning the user making the access.

2. The inventory monitoring system of claim 1, wherein: said software program generating a report when one of said plurality of containers is opened and when one of said plurality of containers is not closed.

3. The inventory monitoring system of claim 1, wherein: said software program offering access to training videos or product information concerning items stored in said plurality of containers.

4. The inventory monitoring system of claim 1, further comprising:

a display device connected to said computer, said display device enables a user to communicate with said software program.

5. The inventory monitoring system of claim 1, wherein: said software program providing a maintenance notice when at least one of said plurality of containers needs maintenance.

6. The inventory monitoring system of claim 1, wherein: said software program providing a sensor report for a plurality of sensors in said plurality of containers.

7. An inventory monitoring system, comprising:

a plurality of containers, each one of said plurality of containers including a wireless communication device and an opening and closing sensor;

a computer capable of wirelessly communicating with said plurality of containers through a software program, said opening and closing sensor sends data to said computer concerning the opening and closing of said plurality of containers; and at least one training video associated with at least one item in said plurality of containers, said training video providing instructions on how to use the at least one item in said plurality of containers.

8. The inventory monitoring system of claim 7, wherein: said training video includes a test to ensure that a participant understood the said training video, said test includes a plurality of questions.

9. The inventory monitoring system of claim 7, further comprising:

answers to said test are compared by an artificial intelligence module connected to said computer to the correct answers and the participant provided with a test score.

10. The inventory monitoring system of claim 7, further comprising:

a product or device information module for storing information concerning the at least one item stored in the plurality of containers.

11. The inventory monitoring system of claim 7, wherein: said software program offering access to said at least one training video concerning the at least one item stored in said plurality of containers.

12. The inventory monitoring system of claim 7, wherein: said software program generating a report with a time stamp, length of time opened and closed and production or device information, when one of said plurality of containers is opened and when one of said plurality of containers is not closed.

13. The inventory monitoring system of claim 7, wherein: said software program providing a maintenance notice when at least one of said plurality of containers needs maintenance.

14. The inventory monitoring system of claim 7, wherein: said software program providing a sensor report for a plurality of sensors in said plurality of containers.

15. An inventory monitoring system, comprising:

a plurality of containers each said container including a wireless communication device and an item tracking sensor;

a computer capable of wirelessly communicating with said plurality of containers, said item tracking sensor sends data to said computer concerning items removed from said plurality of containers;

a software program installed on said computer or a cellular device, said software program receives said data from said plurality of containers, said software program stores a list of the items removed and added to each one of said plurality of containers; and an artificial intelligence module installed on said computer, said artificial intelligence module automatically reorders items in said plurality of containers based on the frequency of the items removed from the container, said artificial intelligence module will reorder the items in the plurality of containers before the items are no longer available in the plurality of containers.

16. The inventory monitoring system of claim 15 further comprising:

a display device connected to said computer, said display device enables a user to communicate with said software program.

17. The inventory monitoring system of claim 15, wherein:

said software program stores a list of the items removed and added to each one of said plurality of containers, wherein said software program provides a report about each one of said plurality of containers when requested by a user.

18. The inventory monitoring system of claim 15, wherein:

said software program offers access to training videos concerning items stored in said plurality of containers.

19. The inventory monitoring system of claim 15, wherein:

said software program generating a report when one of said plurality of containers is opened and when one of said plurality of containers is not closed.

20. The inventory monitoring system of claim 15, wherein:

said software program providing a maintenance notice when at least one of said plurality of containers needs maintenance.

* * * * *